Patented Aug. 8, 1933

1,921,010

UNITED STATES PATENT OFFICE 1,921,010

ART OF COLORING MINERAL MATTER

Horatio L. Small, Esmont, Va., assignor to The Philip Carey Manufacturing Company, a Corporation of Ohio No Drawing. Application February 3, 1930
Serial No. 425,722

3 Claims. (Cl. 91—70)

My invention is related to processes of coloring mineral material such as granular, natural deposits of various kinds. Slate or other materials having a slaty cleavage are generally preferred because they break up into granules of a shape believed to be superior for surfacing. Slate is not, however, the only material suitable for use; and indeed so far as the coloring process itself is concerned, since the mineral granules in the process hereinafter to be referred to, are essentially merely a vehicle or support for the superimposed color coating, I am not aware of any mineral substance which is not suitable for coloring providing only it will withstand a roasting treatment within the degrees of time and temperature control of which the process is susceptible.

The general process referred to is set forth in the application of Harry C. Fisher, Ser. No. 26,829, filed April 29, 1925, which teaches generally the coating of mineral granules with a soluble silicate such as a silicate of soda or potassium, and a pigmenting substance, and afterwards dehydrating the coating on the granules to render the silicate substantially insoluble, hard, permanent and weather resisting.

Patent No. 1,572,425, issued Feb. 9, 1926, to Harry C. Fisher describes an improvement on the said process having to do with the formation of the initial silicate coating before dehydration, and teaches the mixing of the dry pigmenting material in powdered form with the granular mineral so as to effect a distribution of the pigmenting material over the granular surfaces, and before adding the silicate of soda whereby the pigment is bound to the granules.

My present invention is addressed to a still further improvement in the formation of the initial coating.

The general object of my invention is to produce a coating substance which may be applied to granule surfaces all in one operation, which effects a better utilization of the pigmenting material, and which gives in the final product better colors and a degree of color control irrespective of the amount of pigment used. In other words, one object of my invention is the more effective use of the same amount of pigment.

These and other objects of my invention which may be set forth hereinafter or which will be apparent to one skilled in the art upon reading these specifications, I accomplish by that certain process of which I shall now describe a preferred embodiment, it being understood that modifications may be made in my process without departing from the spirit of my invention.

Heretofore, it has been the practice merely to mix the pigmenting material with the silicate of soda solution (and such amounts of water as may be required) and then to impose this coating substance upon the granule surface, or to follow the procedure of Patent No. 1,572,425 hereinabove referred to. It has also been suggested to produce a silicate which per se is colored just as glass might be colored, prior to the operations necessary to put the said silicate into water solution. All of these processes are feasible and give commercially satisfactory colors; but I have discovered not only that I can greatly improve the color but also control the depth thereof to a very considerable extent by effecting a more intimate admixture and a dispersion of the pigmenting material in the silicate before coating the granules therewith; and the way in which I accomplish this, briefly, is by grinding together the soluble silicate and the coloring pigment with or without the addition of water. I have found satisfactory for this purpose the use of a pebble or ball mill, and in practicing my invention I introduce the silicate of soda, water and coloring pigment into the mill and grind them together. By this method the pigment is usually reduced considerably in fineness, the silicate is ground into each particle and there is effected an extremely fine and uniform dispersion of the pigment in the silicate body. Into each particle of coloring pigment a certain definite amount of silicate of soda is ground. As the particles of pigment become fully impregnated, they break down more rapidly; and the absorption of silicate of soda becomes greater in proportion. The result of this grinding together of the silicate and the pigment is the formation of what may be termed a colored silicate of great intensity of color and relatively great permanence in the sense that there is very little tendency for the coloring matter to settle out upon standing. In this way not only is a more homogeneous and complete dispersion of the color effected throughout the body of the silicate, but when the color coating material is applied to the granules, the color distribution is better on the granule surfaces; and I have found that by this process I secure in the finished product greatly intensified colors. I do not wish to limit myself by theories as to why this is so. However, I believe that color distribution is an important factor in the increased vividness which I obtain. Again however, where the pigment used is one, the color of which is likely to be affected by heat in the roasting treatment, I recognize that grinding the pigment with the silicate may more effectively protect the pigment particles from the roasting treatment as well as from the effects of the roasting atmosphere, by assuring the thorough coating and impregnation of pigment particles by the protecting silicate.

In my process I find it preferable to charge the silicate and water into the ball mill, then to add the pigment, and to grind the substances together for from one half hour to one hour depending on the intensity of the hue desired. However, the order of adding the material to the ball mill may be varied with but little change, and I do not wish to limit myself in this respect. In some cases I have found it better to grind the silicate of soda and pigment together and later to thin the mixture with water; while in other cases it is preferable to add all of the materials at one time to the mill. Similarly I do not wish to limit myself to the time of grinding. As has been suggested, I have found that the time of grinding per se will vary the hue of the resultant product in many cases, thus giving me with the same materials in the same proportions, a color control not heretofore discovered. Up to a certain limit, the color of the pigments used is intensified the longer the grinding is continued. Apparently there is a point at which the pigment becomes so fine and is so intimately admixed with the silicate that further mechanical grinding does not produce marked color intensification; but the time of grinding will vary with the pigments used and the size of pigment particles. Having arrived at the best time of grinding to produce a desired hue for any given formula, it is my practice then to adhere rigidly to this time for this formula in commercial practice.

I have not set forth herein any formula. It is preferable to use, as set forth in the copending application hereinabove referred to, a silicate of soda having a high $SiO_2$ content in relation to the $Na_2O$ content. I may use the formulæ specifically set forth in the said copending application, or I may use other formulæ and other pigmenting substances as may appear desirable to produce new colors.

Having ground the silicate of soda into the pigment and having produced thereby a syrupy mixture, I next add the desired amount of this mixture to the slate granules in an agitator, and after a thorough mixing so that each particular granule is well colored, I then follow this with a rapid heat treatment to dehydrate the silicate and render it weather resistant, as described in the said copending application or in Patents Nos. 1,572,425 or 1,631,628. I may, of course, employ other treatments including the one set forth in my copending application Serial No. 425,723, filed Feb. 3, 1930; my present invention is concerned with the preparation of the color coating.

It will be understood that my invention is not limited to the use of any particular vehicle or any particular pigmenting substance, and that I may for example, add to a suitable vehicle, materials other than pigments, such as glass forming materials, fluxes and the like, or that I may use more than one pigment or combinations of pigments and other substances.

Having thus described my invention, what I claim as new and desire to secure by Letters Patent, is:—

1. A process of coloring mineral granules such as slate, which comprises grinding together a pigmenting substance and a solution of silicate of soda, imposing the material thus formed upon the mineral granules, and heat-treating the mineral granules with agitation, to the extent of forming thereon a weatherproof coating.

2. A process of coloring mineral granules such as slate, which comprises grinding together a pigmenting substance and a soluble silicate solution to the extent of distributing said substance in finely divided form throughout said solution, afterward imposing the material thus formed upon the mineral granules, and roasting the mineral granules with agitation.

3. A process of coloring mineral granules such as slate, which comprises grinding together a pigmenting substance and a soluble silicate solution to the extent of forming a stable dispersion of the pigment in the silicate, imposing the material thus formed upon the mineral granules, and roasting the mineral granules with agitation.

HORATIO L. SMALL.